US012606382B2

(12) United States Patent
Franklin

(10) Patent No.: US 12,606,382 B2
(45) Date of Patent: Apr. 21, 2026

(54) WAREWASHER CONVEYOR WITH TILTING CONVEYOR CHAIN ASSEMBLY

(71) Applicant: Ali Group North America Corporation, Vernon Hills, IL (US)

(72) Inventor: Randall Eugene Franklin, Winston-Salem, NC (US)

(73) Assignee: ALI GROUP NORTH AMERICA CORPORATION, Vernon Hills, IL (US)

( * ) Notice: Subject to any disclaimer, the term of this patent is extended or adjusted under 35 U.S.C. 154(b) by 216 days.

(21) Appl. No.: 18/647,795

(22) Filed: Apr. 26, 2024

(65) Prior Publication Data

US 2025/0333248 A1 Oct. 30, 2025

(51) Int. Cl.
　B65G 17/08 (2006.01)
　A47L 15/24 (2006.01)
　B65G 21/10 (2006.01)

(52) U.S. Cl.
　CPC .......... B65G 17/086 (2013.01); A47L 15/241 (2013.01); A47L 15/248 (2013.01); B65G 21/10 (2013.01); B65G 2207/26 (2013.01)

(58) Field of Classification Search
　CPC .. B65G 17/086; B65G 21/10; B65G 2207/26; A47L 15/241; A47L 15/248
　USPC ........................................................ 198/632
　See application file for complete search history.

(56) References Cited

U.S. PATENT DOCUMENTS 4,418,435 A * 12/1983 Arnold ..................... B08B 1/12
15/93.1

OTHER PUBLICATIONS

EP0275564 (Year: 1988).*
EP3050829 (Year: 2018).*
KR101872152 (Year: 2018).*
Aerowerks®, "Installation, Maintenance and Operating Instruction "Tite-Turn Unloader" 90 and 180 Degree Turns", 2017, pp. 1-9.
The Spirit of Excellence Group, "bi line Conveyor Systems Installation, Operation, Cleaning, and Parts Manuel Model: PRO-90B 90° Corner Conveyor Table", Issue Date: 7.5.22, Manual P/N 117558 rev. A, USA, pp. 1-16.

* cited by examiner

Primary Examiner — Gene O Crawford
Assistant Examiner — Lester Rushin, III
(74) Attorney, Agent, or Firm — COATS & BENNETT, PLLC

(57) ABSTRACT

A warewasher conveyor assembly that may be a loader version or an unloader version for a commercial dishwasher. The warewasher conveyor assembly has a base and a chain conveyor assembly movably mounted to the base. The chain conveyor assembly is movable between a generally level in-use position and a tilted cleaning position where one end is raised, which allows for more convenient cleaning. The warewasher conveyor assembly also includes a movable support, such as a gas spring, which holds the chain conveyor assembly in the cleaning configuration. Related methods are also disclosed.

19 Claims, 10 Drawing Sheets

WAREWASHER CONVEYOR WITH TILTING CONVEYOR CHAIN ASSEMBLY

BACKGROUND

The present invention is generally directed to food dishware washing devices, and more particularly to a warewasher conveyor table device that moves wares to/from a washing/rinsing machine, and related methods.

Restaurants and other food service establishments typically employ numerous devices to clean their plates, cups, glasses, utensils, and the like, collectively referred to in the art as "dishware" or simply "wares". One common example is a dishwashing machine, sometimes referred to in the field as a "warewasher." While dishwashing machines are also found in household settings, commercial dishwashing equipment differs in that they are typically faster and must meet numerous additional requirements, such as those dictated by health codes. Faster cleaning allows the food service establishment to have a lower inventory of wares, which takes up less physical space and lowers operating costs. In conveyor type commercial dishwashing machines, the wares are typically loaded in movable trays called "racks" which are moved through washing/rinsing machine. These racks are fed to the washing/rinsing machine by a conveyor on an input side, called a "loader" conveyor table, and moved away from the washing/rinsing machine by a conveyor on an output side, called an "unloader" conveyor table.

For proper machine hygiene, the loader and unloader should be cleaned on a regular basis. Cleaning around the conveyor portions of the loader or unloader can be a complex process, particularly for non-straight type loaders and unloaders (e.g., "corner" loaders or unloaders), which typically change the direction of movement of the racks by 90 degrees (or sometimes other amounts, such as 180 degrees) along a curved path. In conventional versions of such non-straight loaders and unloaders, the conveyor mechanism is statically located, and it may be challenging to access portions of the conveyor mechanism for cleaning. These challenges may lead to the cleaning process taking longer than otherwise necessary, and/or increased training burdens, both of which tend to increase operating costs.

As such, there remains a need for alternative approaches to warewasher conveyor tables, particularly approaches that allow for easier cleaning.

SUMMARY

The present disclosure is generally directed to a warewasher conveyor assembly that is in some embodiments a loader, and in other embodiments an unloader, for a commercial dishwasher, and related methods. In some embodiments, the warewasher conveyor assembly has a base and a chain conveyor assembly movably mounted to the base. The chain conveyor assembly is movable between a generally level in-use position and a tilted cleaning position which allows for more convenient cleaning. The warewasher conveyor assembly includes a movable support, such as a gas spring, which holds the chain conveyor assembly in the cleaning configuration.

In one or more embodiments, the present disclosure relates to a warewasher conveyor assembly that includes a base, a chain conveyor assembly, and a movable support. The base has an input side and an output side that are angled relative to each other. The chain conveyor assembly includes a first end portion and a second end portion; a chain conveyor operative to convey wareracks from the input side to the output side along a curved path; and a drive sprocket engaging the chain conveyor. The chain conveyor assembly is pivotally mounted to the base so as to be pivotable about a pivot axis between an in-use position and a cleaning position. In the in-use position, chain conveyor assembly is in a level orientation relative to the base so as to be generally parallel to the base. In the cleaning position, the chain conveyor assembly is in a tilted orientation relative to the base so as to be angled upward relative to the base from the first end portion to the second end portion. The movable support is mounted to the chain conveyor assembly between the first end portion and the second end portion. The warewasher conveyor assembly is movable between an in-use configuration and a cleaning configuration while maintaining the chain conveyor engaged with the drive sprocket. In the in-use configuration, the chain conveyor assembly is in the in-use position. In the cleaning configuration, the chain conveyor assembly is in the cleaning position and held in the tilted orientation by the support.

In one or more other embodiments, the disclosure relates to a warewasher conveyor assembly having a base, a chain conveyor assembly, and a movable support. The base has an input side and an output side that are angled relative to each other. The chain conveyor assembly includes a pivot end portion disposed at a fixed height from the base and a second end portion that is disposed at a variable height from the base; a chain conveyor operative to convey wareracks from the input side to the output side along a curved path; and a drive sprocket engaging the chain conveyor. The chain conveyor assembly is pivotally mounted to the base at the pivot end portion so as to be pivotable about a pivot axis. The movable support is mounted to the chain conveyor assembly between the pivot end portion and the second end portion. The warewasher conveyor assembly is movable between an in-use configuration and a cleaning configuration while maintaining the chain conveyor engaged with the drive sprocket. In the in-use configuration, the second end portion is disposed closer to the base such that the chain conveyor assembly is generally parallel to the base. In the cleaning configuration, the chain conveyor assembly is tilted relative to the base with the second end portion disposed farther from the base and held away from the base by the support.

The features, functions, and/or advantages that have been discussed can be achieved independently in various embodiments or may be combined in yet other embodiments, further details of which can be appreciated with reference to the following description and the drawings

DESCRIPTION

Figure 1:
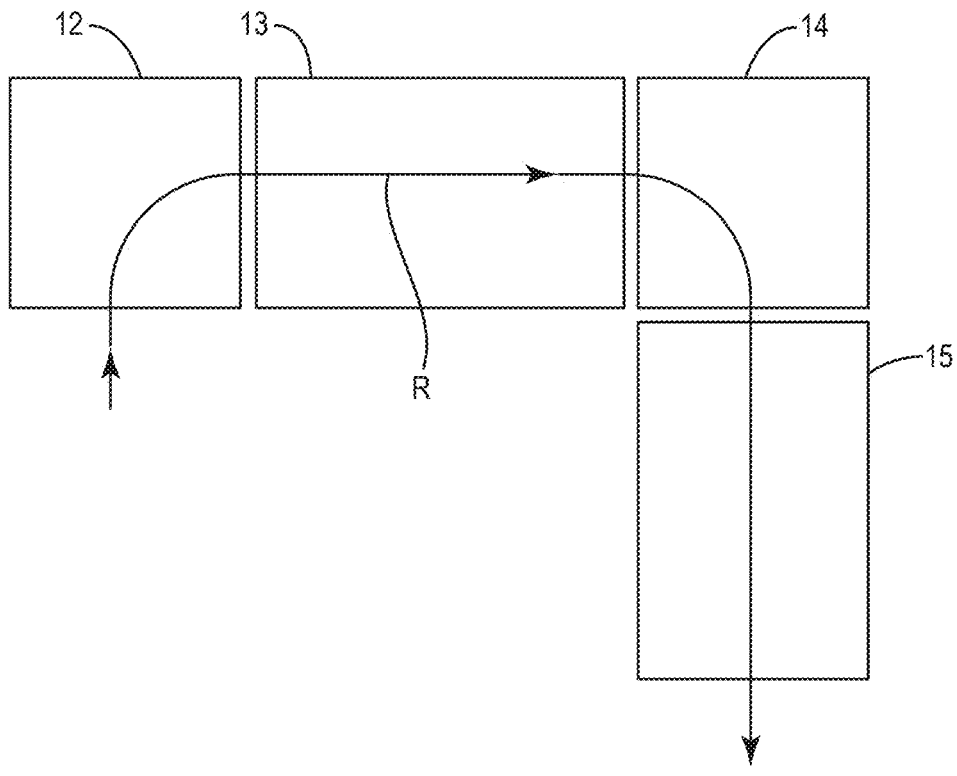
FIG. 1 shows a simplified schematic diagram of an exemplary arrangement of a warewasher system having a dishwasher, loader, and unloader.

The present invention relates to a warewasher conveyor assembly 20 that is in some embodiments a loader, and in other embodiments an unloader, for a commercial dishwasher, and related methods. A typical arrangement for a warewasher system 10 for a corner of a restaurant or institutional kitchen is shown in FIG. 1. The dishes and other wares are loaded in "racks" and transported through the system 10 along a path rack R. The loader 12 is located upstream of the dishwasher 13 and feeds the racks to the dishwasher 13 by moving the racks on a conveyor along a path that is at least partially curved. The dishwasher 13 cleans the wares and outputs them to the unloader 14. The unloader 14 is located downstream of the dishwasher 13 and receives the racks from the dishwasher 13 and moves them on a conveyor away from the dishwasher 13. A clean dish station 15, such as a simple table or linear conveyor, is optionally disposed downstream of the unloader 14. For purposes of clarity, the following discussion will generally be in the context of a loader 12, it being understood that the concepts discussed herein may alternatively be employed in an unloader 14.

Figure 2:
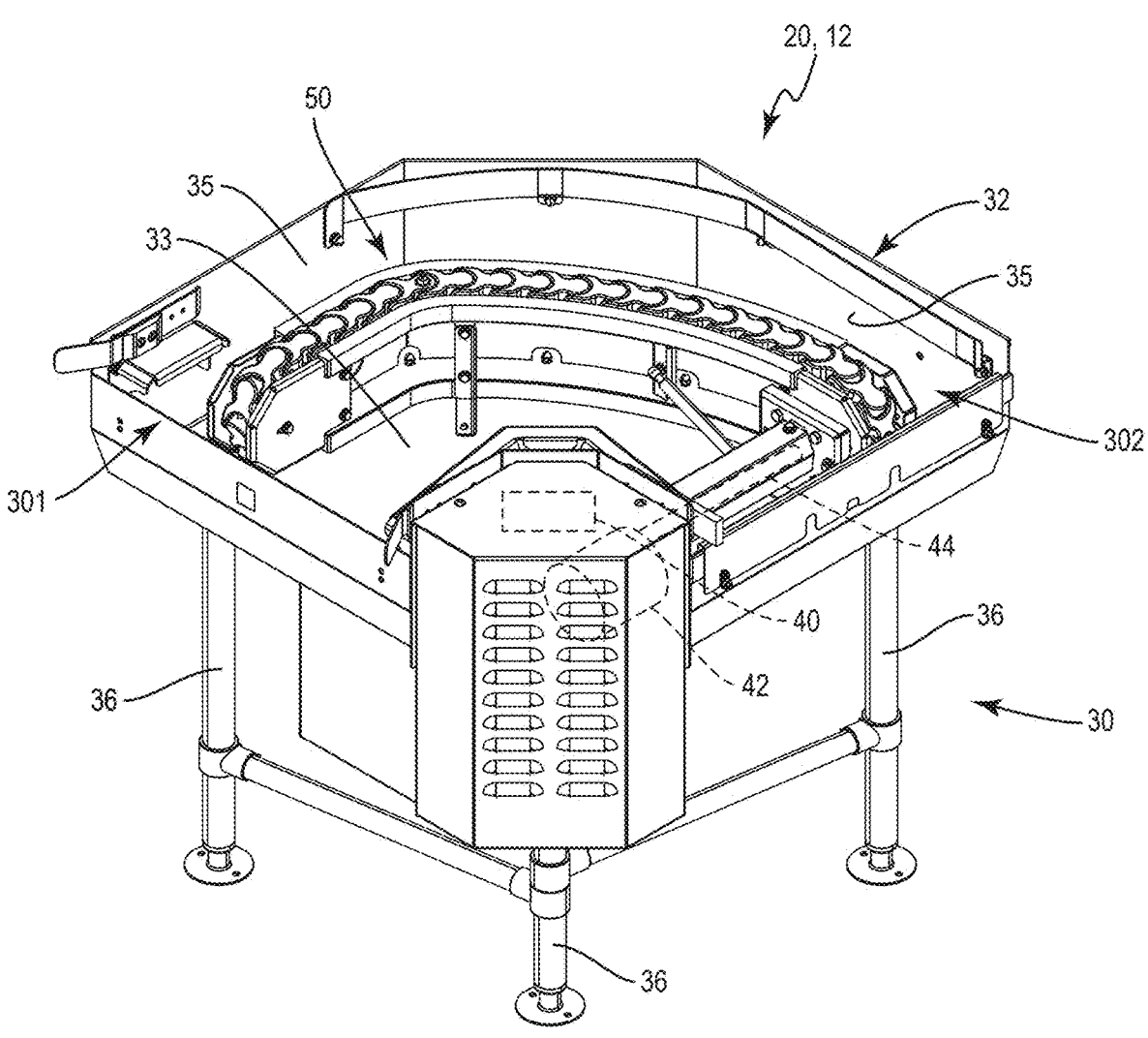
FIG. 2 shows a front perspective view of a warewasher machine loader according to one or more embodiments, with the chain conveyor assembly in the in-use configuration.
Figure 3:
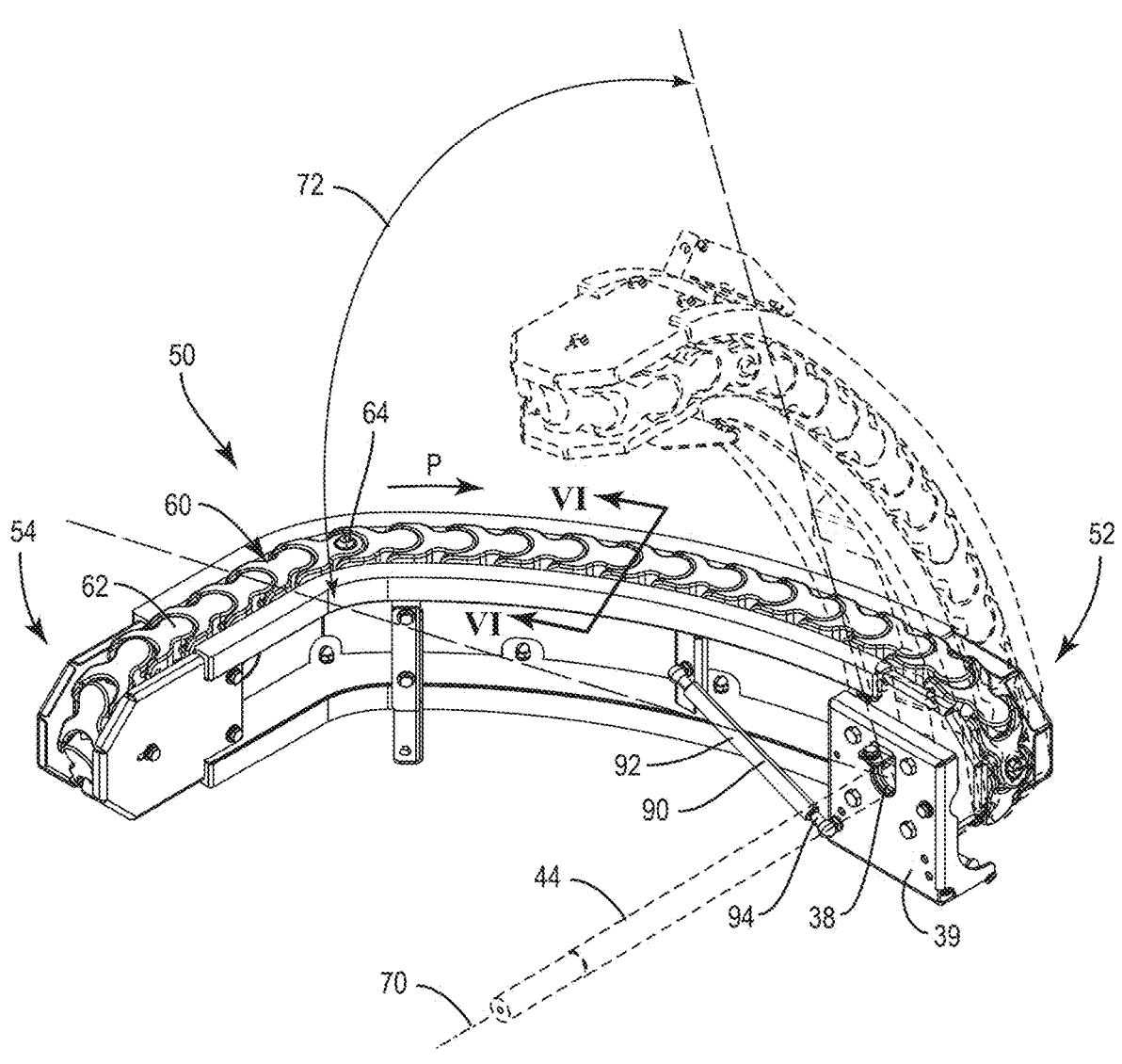
FIG. 3 shows a chain conveyor assembly of the machine of FIG. 2, with an associated drive shaft (dashed), bearing assembly, and movable support.
Figure 4:
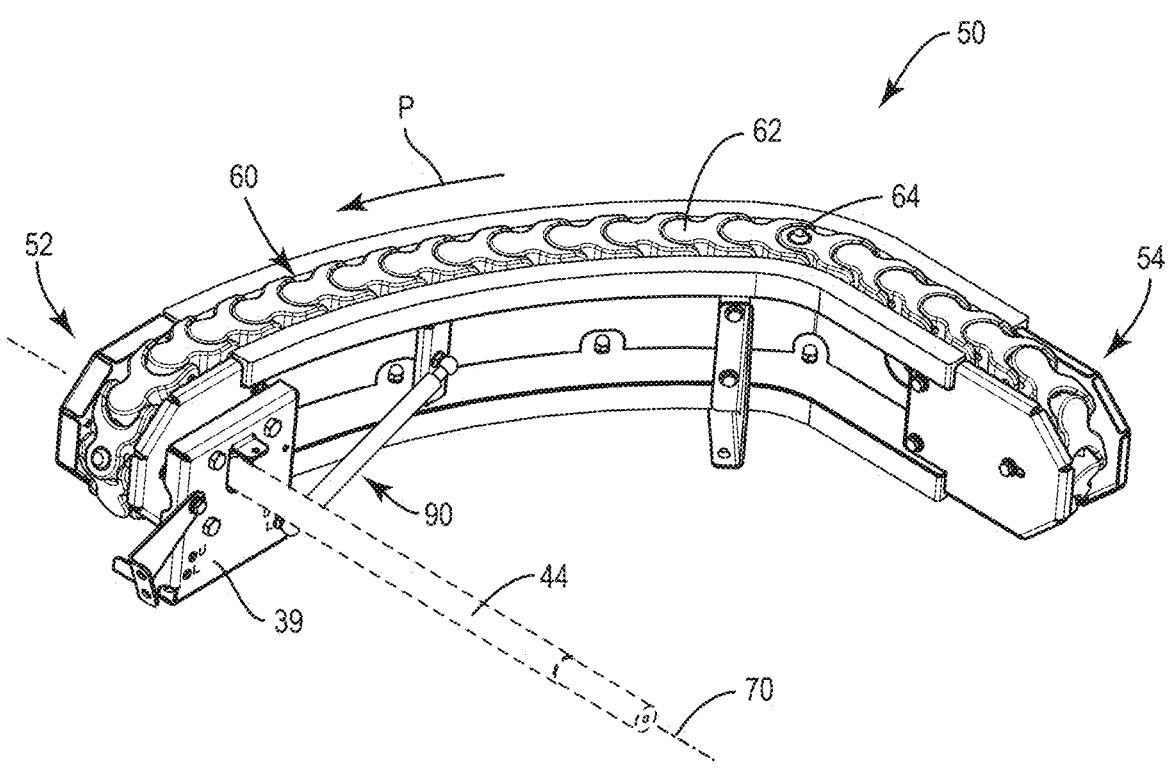
FIG. 4 shows an alternative configuration of a chain conveyor assembly, configured to move racks right to left, rather than left to right, with an associated drive shaft (dashed), bearing assembly, and movable support.
Figure 5:
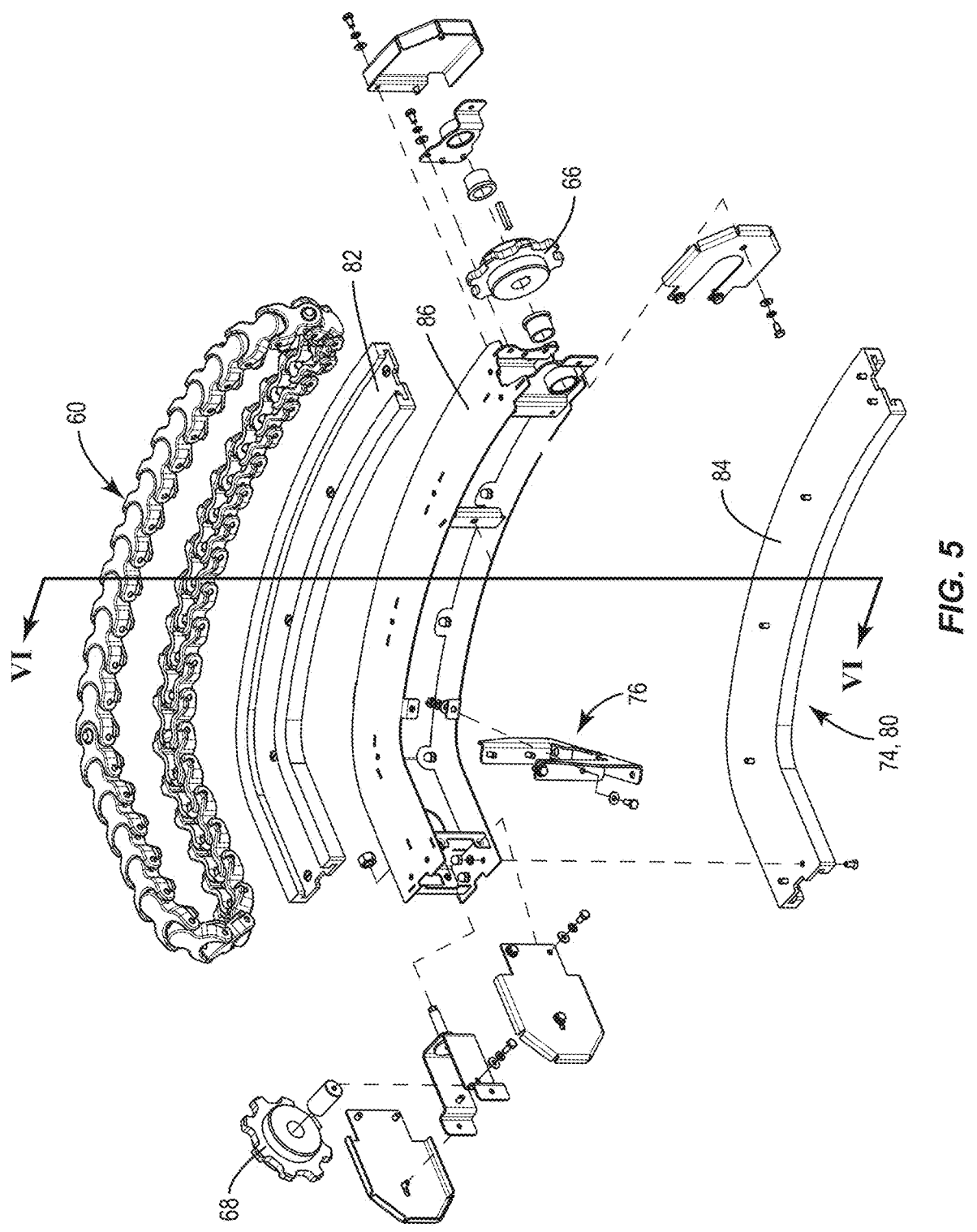
FIG. 5 shows partially exploded view of the chain conveyor assembly of FIG. 3.
Figure 6:
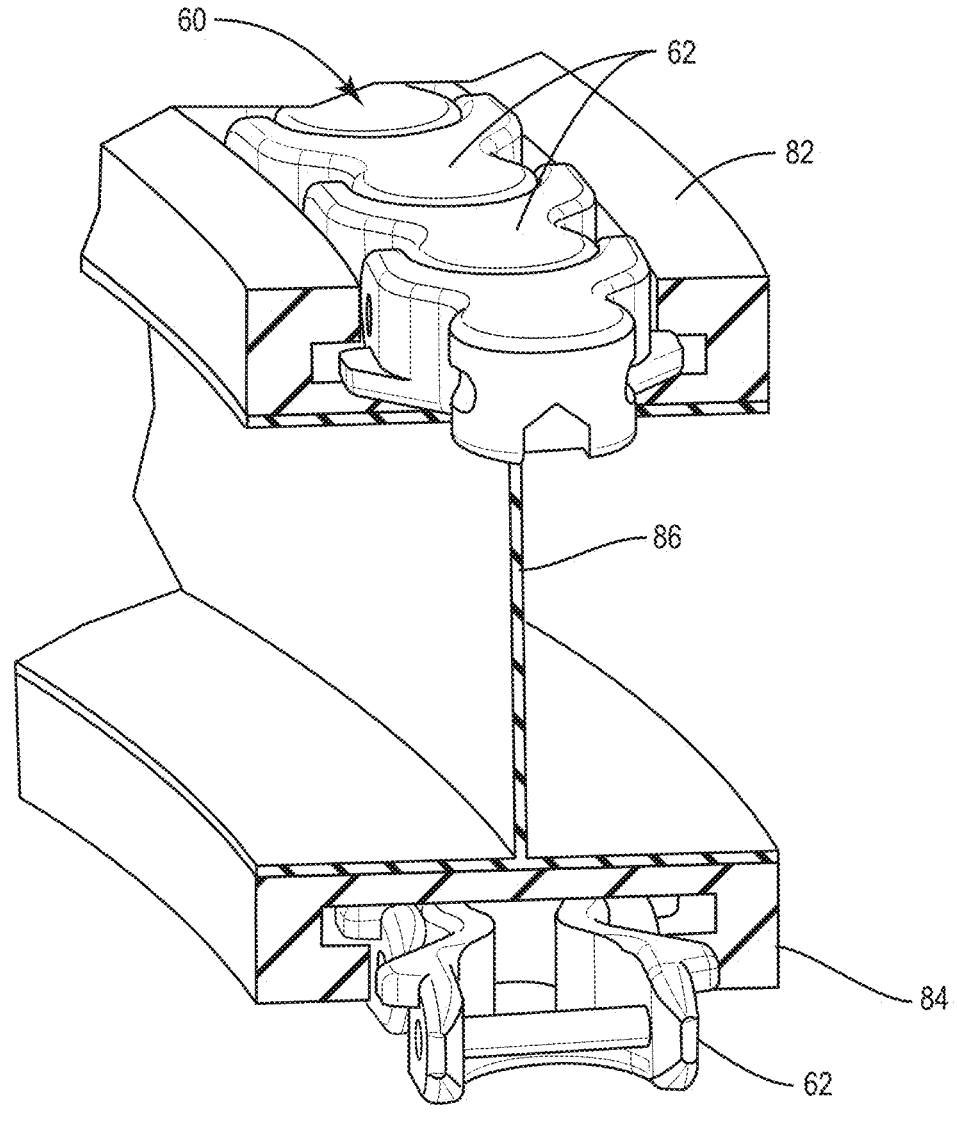
FIG. 6 shows a cross-section of the chain conveyor assembly along line VI-VI, with a full segment shown for clarity.
Figure 7:
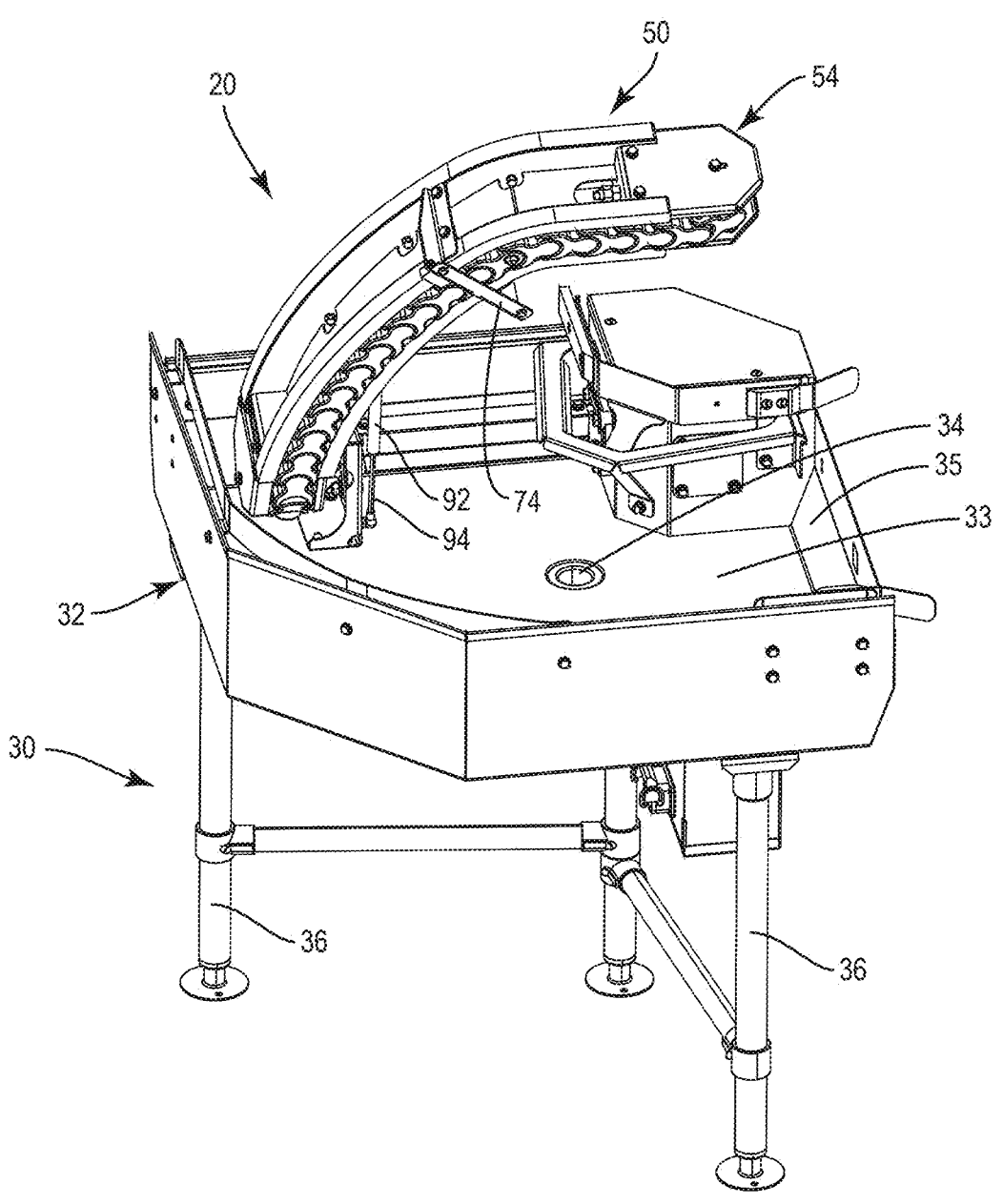
FIG. 7 shows a side perspective view of the machine of FIG. 2, with the chain conveyor assembly in the cleaning configuration.
Figure 8:
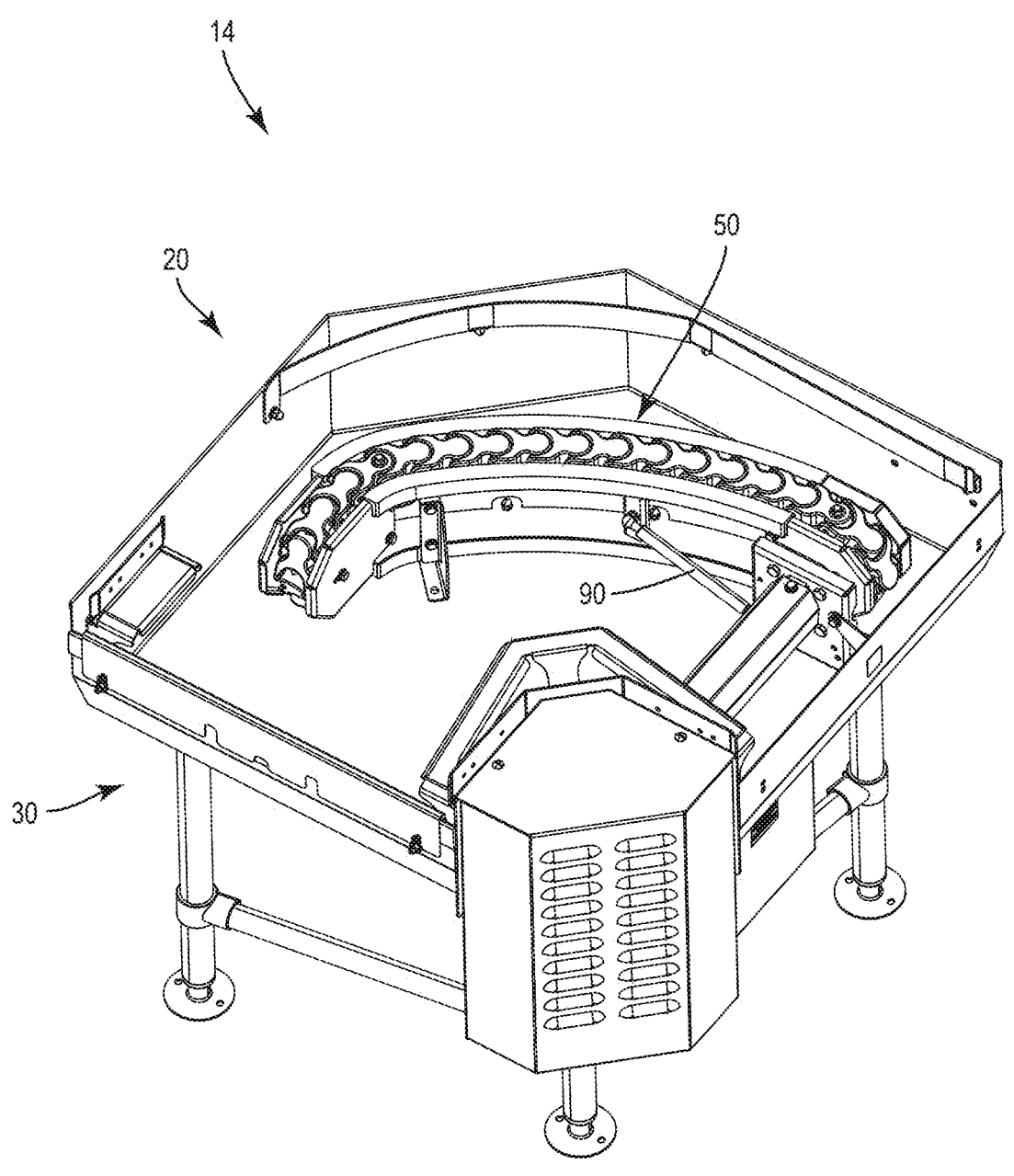
FIG. 8 shows a front perspective view of a warewasher machine unloader according to one or more embodiments, with the chain conveyor assembly in the in-use configuration.
Figure 9:
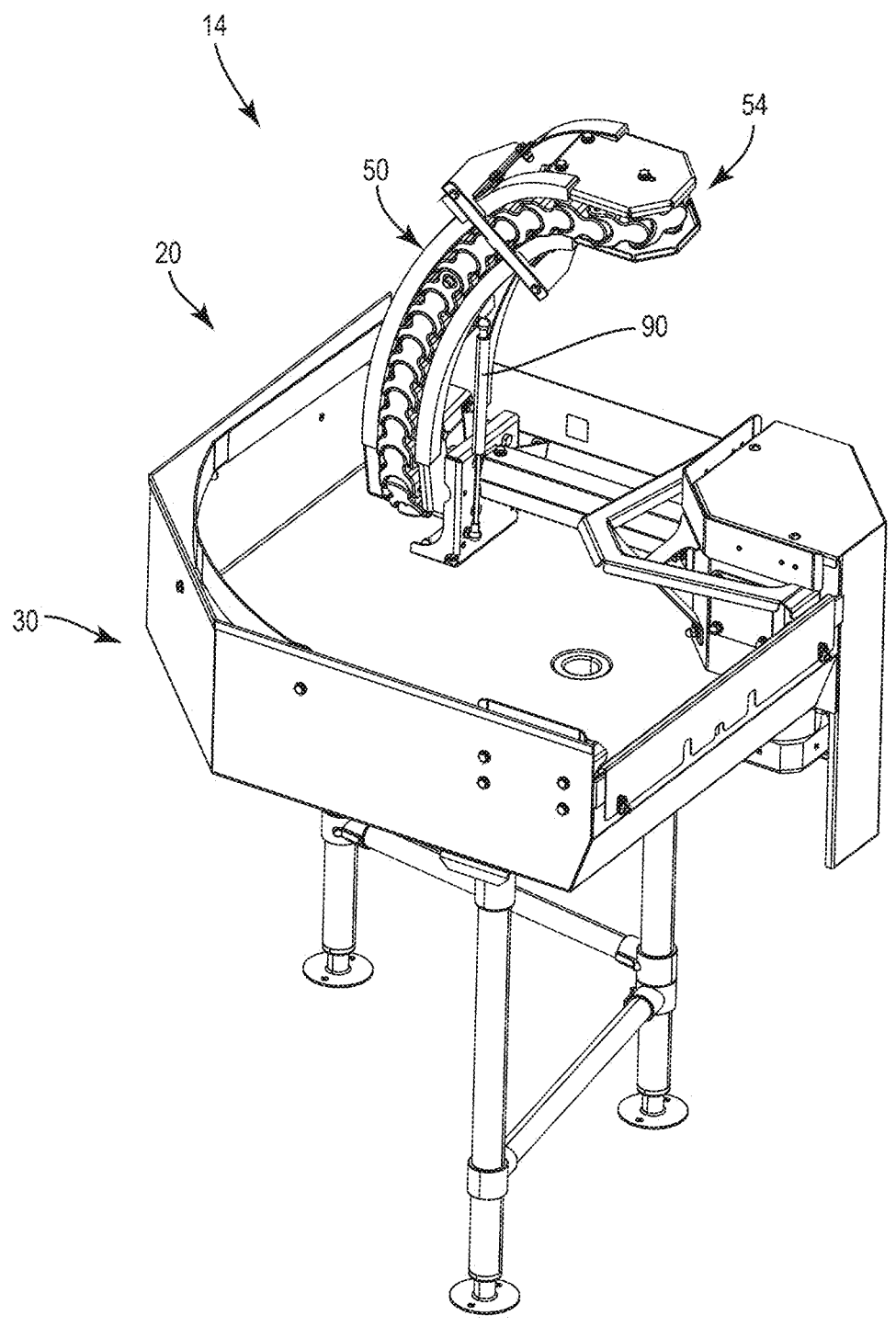
FIG. 9 shows a side perspective view of the machine of FIG. 8, with the chain conveyor assembly in the cleaning configuration.

The warewasher conveyor assembly 20 of the present invention has a chain conveyor assembly 50 that is movable between a generally level in-use configuration (e.g., FIG. 2 and FIG. 8) and a tilted cleaning configuration (e.g., FIG. 7 and FIG. 9). The warewasher conveyor assembly 20 includes a movable support 90 that holds the chain conveyor assembly 50 in the cleaning configuration.

Turning to FIGS. 2-7, the warewasher conveyor assembly, generally indicated at 20, includes a base 30 (sometimes called a "table"), a chain conveyor assembly 50, and a movable support 90. The base 30 has an input side 301 and an output side 302 that are angled relative to each other, typically by ninety degrees, but other non-zero relative angles are possible. The base 30 typically includes a pan 32, with a slightly sloped floor 33 having a drain 34, for facilitating cleaning. The pan 32 has suitable sidewalls forming a perimeter wall 35, and is supported by suitable legs 36. Control electronics 40 and a motor 42 are attached to the pan 32 and/or legs 36. The motor 42 is controlled by the control electronics 40 and provides rotational power to drive sprocket 66, typically via a drive shaft 44. Drive shaft 44 extends from the motor 42 to a drive sprocket 66 through a bearing 38 that is supported by a bearing frame 39 that extends upward from the floor 33. In some embodiments, the drive shaft 44 is disposed along pivot axis 70, discussed below. The base 30 may include other features known in the art that are not important for understanding the principal(s) of the invention.

Figure 10:
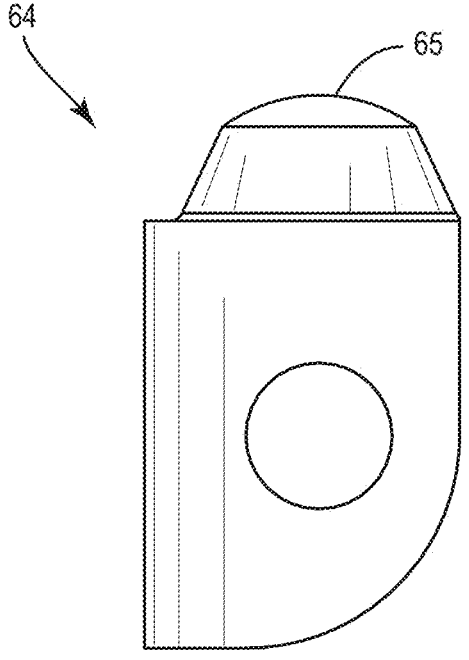
FIG. 10 shows a partial side view of a rounded top drive peg.
Figure 11:
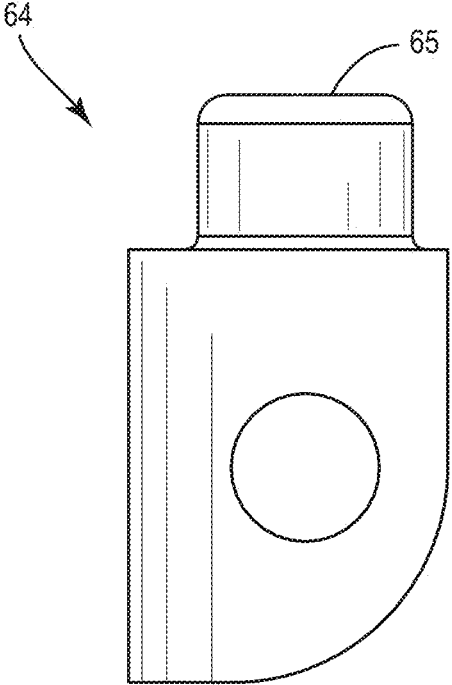
FIG. 11 shows a partial side view of a flat top drive peg.

The chain conveyor assembly 50 is movably mounted to the base 30, so as to be pivotable between an in-use or down position (e.g., FIG. 2) and a cleaning or up position (e.g., FIG. 7), with the pivoting being about pivot axis 70 that is advantageously generally horizontal. The chain conveyor assembly 50 extends from a first end portion 52 to a second end portion 54, and includes a chain conveyor 60. The chain conveyor 60 is disposed in a loop between drive sprocket 66 and an idler sprocket 68. The chain conveyor 60 includes a plurality of segments 62 linked together for movement. A plurality of drive pegs 64 are disposed along the chain conveyor 60, and are intended to inter-engage with the racks to cause the racks to move with the conveyor. The drive pegs 64 may take any suitable shape, such as having their upper portions tapered with a rounded tip 65 (FIG. 10), or being generally cylindrical with a flat tip 65 (FIG. 11). The drive pegs 64 are advantageously spaced approximately one rack length apart. The chain conveyor 60 follows a path P that is curved between its input to its output. Note that the conveyor path P may also include one or more straight sections as appropriate.

A guide assembly 80 helps guide the chain conveyor 60. The guide assembly 80 advantageously includes a first chain guide 82 and a second chain guide 84 disposed on opposing sides of a guide frame 86. Together, the guide frame 86 and the first and second chain guides 82,84 form a housing 74 that partially encloses the chain conveyor 60. The guide frame 86 is curved, and advantageously has an I-shaped cross-section, see FIG. 6. This cross-sectional shape, by exposing all or substantially all of the lateral surfaces of the guide frame 86, allows for easier cleaning than a conventional box-shaped cross-section. In some embodiments, an optional foot 76 is statically mounted to the housing 74, at a suitable location between the first end portion 52 and the second end portion 54, and disposed so to as support the housing 74 against the base 30 when the chain conveyor assembly 50 is in the in-use position (discussed further below). The foot 76 may take any suitable form, such as a simple flange with or without a cushioned lower side.

The drive sprocket 66 and idler sprocket 68 are mounted to respective end portions of the guide frame 86. The drive sprocket 66 inter-engages with the chain conveyor 60 to supply motive force to move/rotate the chain conveyor 60. The idler sprocket 68 operates in a conventional fashion to maintain tension in the chain conveyor 60 it moves. The drive sprocket 66 is advantageously located toward the downstream end of the chain conveyor assembly 50, and the idler sprocket 68 is advantageously located proximate the upstream end of the chain conveyor assembly 50, so that the drive sprocket 66 pulls the upper portion of the chain conveyor 60; however, the upstream/downstream arrangement may be inverted if desired.

As mentioned above, the chain conveyor assembly 50 is pivotable relative to the base 30 between an in-use or down position (e.g., FIG. 2) and a cleaning or up position (e.g., FIG. 8), with the pivoting being about pivot axis 70. In the in-use position, the chain conveyor assembly 50 is advantageously horizontal, so that the upper portion of the chain conveyor 60 is advantageously parallel to the ground and the base 30. In the cleaning position, the chain conveyor assembly 50 is tilted upward at a tilt angle 72 so that the second end portion 54 of the chain conveyor assembly 50 is raised to a greater height above the base 30 to provide good access to the floor 33 underneath the chain conveyor assembly 50.

Thus, the first end portion 52, through which the pivot axis 70 extends, is disposed at a fixed height from the base 30, and may be referred to as the pivot end portion. The second end portion 54 is disposed at a variable height from the base 30, with the second end portion 54 disposed closer to the base 30 when the warewasher conveyor assembly 20 is in the in-use configuration, and disposed farther from the base 30 when the warewasher conveyor assembly 20 is in the cleaning configuration. Note that engagement of the chain conveyor 60 with the drive sprocket 66 is advantageously maintained when moving the chain conveyor assembly 50 between the in-use and cleaning position. In other words, moving the chain conveyor assembly 50 from the in-use position and the cleaning position, and vice versa, the chain conveyor 60 advantageously does not need to be disengaged from the drive sprocket 66. This simplifies the cleaning process.

When the chain conveyor assembly 50 is in the in-use position, the portion of the chain conveyor assembly 50 distal from the pivot axis 70, the second end portion 54 in the illustrated embodiment(s), is supported by foot 76 resting on the floor 33 of the pan 32. When the chain conveyor assembly 50 is in the cleaning position, the second end portion 54 is disposed well above the floor 33 of the pan 32 in cantilever fashion. A movable support 90 is used to help support the chain conveyor assembly 50 in the cleaning position. The movable support 90 is advantageously mounted on one end thereof to the chain conveyor assembly 50 at a position intermediate the first end portion 52 and the second end portion 54. In some embodiments, the other end of the support 90 is mounted to the base 30. In some embodiments, the movable support 90 takes the form of a gas spring mounted on one end to the chain conveyor assembly 50 and on the other end to the base 30, such as at or near the bearing frame 39. The gas spring typically has a cylinder portion 92 and a piston portion 94; the piston portion 94 is advantageously disposed toward the base 30, so that the moving interface of the gas spring is downward facing to have better seal life. The movable support 90 holds the chain conveyor assembly 50 in the tilted orientation so that the user does not need to manually support the chain conveyor assembly 50 during cleaning.

The chain conveyor assembly 50 may form a portion of a loader 12 or an unloader 14. In a loader application, the chain conveyor assembly 50 helps convey racks of wares to be cleaned to the dishwasher 13. For such an arrangement, the output side 302 of the base 30 and the drive sprocket 66 end of the chain conveyor assembly 50 are advantageously located toward the dishwasher 13. During washing operations, the warewasher conveyor assembly 20 is in the in-use configuration, with the chain conveyor assembly 50 in the in-use position. The motor 42 drives the drive sprocket 66 via the driveshaft 44, and the drive sprocket 66 drives the chain conveyor 60, which in turn moves the racks loaded thereon toward the dishwasher 13. At suitable times, the warewasher conveyor assembly 20 is cleaned. To do so, the motor 42 is stopped, optionally by disabling power to the motor 42, and all racks removed from the warewasher conveyor assembly 20. The chain conveyor assembly 50 is then moved to the cleaning position so that the warewasher conveyor assembly 20 assumes the cleaning configuration by raising one end of the chain conveyor assembly 50, the second end portion 54 in this illustrative example. The movable support 90 is moved simultaneously or subsequently to the chain conveyor assembly 50 so that the movable support 90 holds the chain conveyor assembly 50 in the cleaning position. The floor 33 and other areas of the pan 32, and the chain conveyor assembly 50 itself, are then cleaned. After cleaning, the chain conveyor assembly 50 is then returned to the in-use position by lowering the second end portion 54. The warewasher conveyor assembly 20 is then made available for operation in a conventional fashion. Note that in some embodiments, a reed switch or other sensor (not shown) may be used to detect when the chain conveyor assembly 50 is moved from the in-use position, and the motor 42 automatically disabled in response thereto.

FIGS. 8-9 show the warewasher conveyor assembly 20 configured as an unloader 14, where the chain conveyor assembly 50 helps convey racks of wares that have been cleaned away from the dishwasher 13. For such an arrangement, the output side 302 of the base 30 and the drive sprocket 66 end of the chain conveyor assembly 50 are advantageously located away from the dishwasher 13. As above, for washing operations, the warewasher conveyor assembly 20 is in the in-use configuration (FIG. 8), with the chain conveyor assembly 50 in the in-use position. The motor 42 drives the drive sprocket 66 via the driveshaft 44, and the drive sprocket 66 drives the chain conveyor 60, which in turn moves the racks loaded thereon away from the dishwasher 13. At suitable times, the warewasher conveyor assembly 20 is changed to the cleaning configuration (FIG. 9) and cleaned as described above. Note that for an unloader 14, it may be advantageous to have the input portion of the chain conveyor assembly 50 (disposed toward the input side 301) be spaced from the dishwasher 13 sufficiently so that the racks being input to the unloader 14 are not pulled prematurely from the rinse portion of the dishwasher 13.

The discussion above has generally been in the context of the movable support 90 being in the form of a gas spring. However, other forms of the movable support 90 are available. For example, in less preferred embodiments, the movable support 90 may take the form of a "kickstand" type mechanism that is "up" when the chain conveyor assembly 50 is in the in-use position and "down" and resting on the floor 33 when the chain conveyor assembly 50 is the cleaning position. Various forms of movable supports 90 known in the art of bracing may alternatively or additionally be employed.

The discussion above has generally been in the context of the guide frame 86 with the I-shaped cross-section being a portion of a tiltable chain conveyor assembly 50. However, it should be understood that the guide frame 86 with the I-shaped cross-section may alternatively be used in a warewasher conveyor assembly 20 that is similar to those described above, with a chain conveyor assembly that is not tiltable (e.g., fixed relative to base 30).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A warewasher conveyor assembly, comprising:
   a base having an input side and an output side that are angled relative to each other;
   a chain conveyor assembly, comprising:
       a first end portion and a second end portion;
       a chain conveyor operative to convey wareracks from the input side to the output side along a curved path;
       a drive sprocket engaging the chain conveyor;

wherein the chain conveyor assembly is pivotally mounted to the base so as to be pivotable about a pivot axis between an in-use position and a cleaning position; wherein:

in the in-use position, chain conveyor assembly is in a level orientation relative to the base so as to be generally parallel to the base;

in the cleaning position, the chain conveyor assembly is in a tilted orientation relative to the base so as to be angled upward relative to the base from the first end portion to the second end portion;

a movable support mounted to the chain conveyor assembly between the first end portion and the second end portion;

wherein warewasher conveyor assembly is movable between an in-use configuration and a cleaning configuration while maintaining the chain conveyor engaged with the drive sprocket;

wherein:

in the in-use configuration, the chain conveyor assembly is in the in-use position;

in the cleaning configuration, the chain conveyor assembly is in the cleaning position and held in the tilted orientation by the support.

2. The warewasher conveyor assembly of claim 1, wherein the movable support comprises a gas spring mounted to the base and the chain conveyor assembly.

3. The warewasher conveyor assembly of claim 2, wherein gas spring includes a cylinder portion and a piston portion; wherein the piston portion is located closer to the base than the cylinder portion.

4. The warewasher conveyor assembly of claim 1, wherein the chain conveyor assembly pivotally mounts to the base closer to the output side than the input side of the base.

5. The warewasher conveyor assembly of claim 1, wherein the output side is disposed 90 degrees relative to the input side.

6. The warewasher conveyor assembly of claim 1:

wherein the base includes a bearing and a bearing frame disposed along the pivot axis;

wherein the support is mounted to the base at the bearing frame.

7. The warewasher conveyor assembly of claim 1, wherein the warewasher conveyor assembly is configured such that the drive sprocket is driven via a shaft disposed along the pivot axis.

8. The warewasher conveyor assembly of claim 1, wherein the chain conveyor assembly further comprises:

a housing partially enclosing the chain conveyor;

a foot statically mounted to the housing and disposed so as support the housing against the base in the in-use position.

9. The warewasher conveyor assembly of claim 1:

wherein the conveyor chain comprises a plurality of drive pegs;

wherein the drive pegs have a sloped profile with a rounded top.

10. The warewasher conveyor assembly of claim 1:

wherein the conveyor chain comprises a plurality of drive pegs;

wherein the drive pegs have a cylindrical cross-section with a flat top.

11. The warewasher conveyor assembly of claim 1:

wherein the chain conveyor assembly further comprises first and second chain guides configured to guide the conveyor chain, and a guide frame to which the first and second chain guides are mounted;

wherein the guide frame has an I-shaped cross-section.

12. A warewasher conveyor assembly, comprising:

a base having an input side and an output side that are angled relative to each other;

a chain conveyor assembly, comprising:

a pivot end portion disposed a fixed height from the base and a second end portion that is disposed a variable height from the base;

a chain conveyor operative to convey wareracks from the input side to the output side along a curved path;

a drive sprocket engaging the chain conveyor;

wherein the chain conveyor assembly is pivotally mounted to the base at the pivot end portion so as to be pivotable about a pivot axis:

a movable support mounted to the chain conveyor assembly between the pivot end portion and the second end portion;

wherein warewasher conveyor assembly is movable between an in-use configuration and a cleaning configuration while maintaining the chain conveyor engaged with the drive sprocket;

wherein:

in the in-use configuration, the second end portion is disposed closer to the base such that the chain conveyor assembly is generally parallel to the base;

in the cleaning configuration, the chain conveyor assembly is tilted relative to the base with the second end portion disposed farther from the base and held away from the base by the support.

13. The warewasher conveyor assembly of claim 12, wherein the movable support comprises a gas spring mounted to the base and the chain conveyor assembly.

14. The warewasher conveyor assembly of claim 12, wherein the chain conveyor assembly pivotally mounts to the base closer to the input side than the output side of the base.

15. The warewasher conveyor assembly of claim 12:

wherein the base includes a bearing and a bearing frame disposed along the pivot axis;

wherein the support is mounted to the base at the bearing frame.

16. The warewasher conveyor assembly of claim 12, wherein the warewasher conveyor assembly is configured such that the drive sprocket is driven via a shaft disposed along the pivot axis.

17. The warewasher conveyor assembly of claim 12, wherein the chain conveyor assembly further comprises:

a housing partially enclosing the chain conveyor;

a foot statically mounted to the housing and disposed so as support the housing against the base when the warewasher conveyor assembly is in the in-use position.

18. The warewasher conveyor assembly of claim 12:

wherein the conveyor chain comprises a plurality of drive pegs;

wherein the drive pegs have a sloped profile with a rounded top.

19. The warewasher conveyor assembly of claim 12:

wherein the chain conveyor assembly further comprises first and second chain guides configured to guide the conveyor chain, and a guide frame to which the first and second chain guides are mounted;

wherein the guide frame has an I-shaped cross-section.

* * * * *